United States Patent
Chang et al.

(10) Patent No.: US 8,306,417 B2
(45) Date of Patent: *Nov. 6, 2012

(54) BIDIRECTIONAL MULTI-WAVELENGTH OPTICAL SIGNAL ROUTING AND AMPLIFICATION MODULE

(75) Inventors: Chu-Lin Chang, Banciao (TW); Gerd Keiser, Taipei (TW); Shien-Kuei Liaw, Yangmei Township, Taoyuan County (TW); Yu-Sheng Huang, Donggang Township, Pingtung County (TW)

(73) Assignee: National Taiwan University of Science and Technology, Taipei (TW)

( * ) Notice: Subject to any disclaimer, the term of this patent is extended or adjusted under 35 U.S.C. 154(b) by 434 days.

This patent is subject to a terminal disclaimer.

(21) Appl. No.: 12/621,074

(22) Filed: Nov. 18, 2009

(65) Prior Publication Data

US 2010/0316373 A1    Dec. 16, 2010

(30) Foreign Application Priority Data

Jun. 12, 2009  (TW) .............................. 98119806 A

(51) Int. Cl.
*H04B 10/08*    (2006.01)

(52) U.S. Cl. ................ 398/12; 398/10; 398/17; 398/33; 398/72; 398/13; 398/16; 398/158; 398/20; 398/21; 398/159; 398/160; 356/73.1; 385/24; 385/37; 385/16; 385/17; 385/18

(58) Field of Classification Search .................... 398/10, 398/11, 12, 13, 14, 16, 17, 20, 30, 31, 32, 398/33, 34, 37, 38, 135, 66, 67, 68, 70, 71, 398/72, 79, 98, 99, 100, 45, 48, 21, 22, 23, 398/24, 9, 49, 50, 158, 159, 160, 82, 84, 398/101; 356/73.1; 385/24, 37, 16, 17, 18
See application file for complete search history.

(56) References Cited

U.S. PATENT DOCUMENTS 8,077,298 B2 * 12/2011 Wang et al. ................. 356/73.1
2006/0222364 A1 * 10/2006 Chung et al. ................. 398/72

* cited by examiner

*Primary Examiner* — Hanh Phan
(74) *Attorney, Agent, or Firm* — Muncy, Geissler, Olds & Lowe, PLLC

(57) ABSTRACT

The present invention provides a bidirectional optical signal traffic-directing and amplification module which is used in a method for simultaneous real-time status monitoring and troubleshooting of a high-capacity single-fiber hybrid passive optical network that is based on wavelength-division-multiplexing techniques.

20 Claims, 2 Drawing Sheets

BIDIRECTIONAL MULTI-WAVELENGTH OPTICAL SIGNAL ROUTING AND AMPLIFICATION MODULE

BACKGROUND

1. Field of the Invention

This invention relates to a fiber optical network system, and more particularly to a bidirectional optical signal traffic-directing and amplification module, which is applied to a wavelength-division-multiplexing (WDM) passive optical network to effectively detect faults of the wavelength-division-multiplexing passive optical network.

2. Description of the Prior Art

Numerous wavelength-division-multiplexing technical schemes have been proposed to expand the capacity of a passive optical network. The attractive characteristics of a WDM-PON, such as high speed, high capacity, and a low bit-per-second price, allow such a network to support huge real-time on-demand data transmission from the Internet. To maintain a high reliability, a wavelength-division-multiplexing (WDM) passive optical network needs to have an efficient method to cover network status monitoring and response to failure conditions and emergency situations. A significant emphasis has been placed on maintaining and monitoring of a fiber communication network architecture for Internet applications. Network monitoring is important for maintaining a fiber optic communication network to detect and locate break points when failures occur in branch paths of the fiber communication network. Moreover, monitoring and fault-diagnosis methods need higher flexibility so that they can determine continuously real-time network status and detect break points when failures occur in the fiber communication network.

An optical time-domain reflectometer (OTDR) is an instrument that is used for evaluating the physical fidelity of a fiber link. In normal operation, the OTDR sends a series of pulse signals into a fiber network to detect what the fiber connection situation is. The detection mechanism for receiving the returning optical signal is at the same location as that for sending OTDR pulse signals, and the transmitted optical pulse signals are scattered and reflected back as they encounter different refractive index media along the transmission path. The reflected optical signal is then detected, and it is function of time which can be transformed to a function of distance along the fiber to identify and locate faults. Therefore, the OTDR may be used for measuring parameters such as fiber attenuation, fiber length, optical connector and splice losses, light reflection levels, or anomalies along the fiber path.

Numerous prior concepts have been proposed for the use of an OTDR to monitor each WDM channel independently. In these concepts, the OTDR is located at the central office (CO) and the OTDR signal passes through an arrayed waveguide grating (AWG) located at both the CO and the optical network unit (ONU) at the user location. The alternative in the broadband-OTDR case is to make each distribution fiber have a different length, but this is a cumbersome implementation strategy, referring to FTTx PON Technology and Testing, EXFO Inc., Quebec City, Canada, 2005, proposed by A. Girard.

Solutions based on tunable OTDR methods add cost and complexity due to the requirement of a tunable laser source at the CO and the need to schedule OTDR pulse transmission sequentially in a round-robin channel-by-channel manner among the branches of the WDM PON. The concept of Chen et al. (W. Chen, B. De Mulder, J. Vandewege, and X. Z. Qiu), entitled "Embedded OTDR Monitoring of the Fiber Plant behind the PON Power Splitter," Proc. Symp. IEEE/LEOS Benelux Chapter, 2006, Eindhoven, pp. 13-16, requires embedding an OTDR function into each ONU transceiver, which increases the cost of the user device. The method of Hann et al. (S. Hann, J.-S. Yoo, and C.-S. Park,), entitled "Monitoring technique for a hybrid PS/WDM-PON by using a tunable OTDR and FBGs," Meas. Sci. Technol., vol. 17, pp. 1070-1074, April 2006, is based on using a tunable OTDR in conjunction with an individual fiber Bragg grating (FBG) at each ONU, which requires a complex implementation strategy and is not easily expandable. Moreover, the monitoring schemes of Park et al. (J. Park, J. Baik, and C. Lee), entitled "Fault-detection technique in a WDM-PON," Optics Express, vol. 15, pp. 1461-1466, 19 Feb. 2007, require a tunable OTDR, so they have limited expandability capability for adding more users. The proposal of Lim et al. (K. W. Lim, E. S. Son, K. H. Han, and Y. C. Chung), entitled "Fault Localization in WDM Passive Optical Network by Reusing Downstream Light Sources," IEEE Photonics Technol. Letters, vol. 17, pp 2691-2693, December 2005, uses the optical transmitter at the CO to transmit an OTDR pulse upon detecting the absence of upstream signals, which again requires the use of a tunable OTDR to send specific wavelength signals to given failed branches.

Another class of monitoring methods combines the use of a broadband light source that is spectrally sliced at the remote node into multiple monitoring channels. Wavelength-dependent or spectral band-dependent optical reflectors at each ONU then reflect the monitoring channel back to the CO by means of an optical reflector of a wavelength-dependent component such as a fiber Bragg grating, referring to the proposal of S. B. Park, D. K. Jung, H. S. Shin, S. Hwang, Y. Oh, C. Shim, IEE Electron. Lett., vol 42, pp. 239-240, February 2006, or a combination of a wavelength coupler and a wideband mirror centered on the emission waveband of the broadband source, referring to the proposal of K. Lee, S. B. Kang, D. S. Lim, H. K. Lee, and W. V. Sorin, entitled "Fiber Link Loss Monitoring Scheme in Bidirectional WDM Transmission Using ASE-Injected FP-LD," IEEE Photonics Technol. Letters, vol. 18, pp 523-525, 1 Feb. 2006. At the CO the channels are detected using either a series of optical power meters in the proposal of Park et al. or an optical spectrum analyzer (OSA) in the proposal of Lee et al. These methods are limited to detecting link loss and do not identify the location of the fault.

Besides, alternative approaches involve the use of optical encoding methods, proposed by H. Fathallah, M. M. Rad, and L. A. Rusch, entitled "PON Monitoring: Periodic Encoders with Low Capital and Operational Cost," IEEE Photonics Technol. Letters, vol. 20, pp. 2039-2041, 15 Dec. 2008, implementation low-cost vertical cavity surface-emitting lasers (VCSELs) for channel monitoring, proposed by E. Wong, X. Chao, and C. J. Chang-Hasnain, entitled "Upstream vertical cavity surface-emitting lasers for fault monitoring and localization in WDM passive optical networks," Optics Communications, vol. 281, pp. 2218-2226, 2008, or the design of a fail-safe architecture that can provide protection against fiber failures, proposed by A. Chowdhury, M.-F. Huang, H.-C. Chien, G. Ellinas, and G.-K. Chang, entitled "A Self-Survivable WDM-PON Architecture with Centralized Wavelength Monitoring, Protection and Restoration for both Upstream and Downstream Links," OFC/NFOEC 2008 Conf. Proc., San Diego, Paper JThA95, proposed by T.-J. Chan, C.-K. Chan, L.-K. Chen, and F. Tong, entitled "A Self-Protected Architecture for Wavelength-Division-Multiplexed Passive Optical Networks," IEEE Photonics Technol. Letters, vol. 15, pp 1660-1662, November 2003, proposed by K. Lee, S. B. Lee, J. H. Lee, Y.-G. Han, S.-G. Mun, S.-M. Lee, and C.-H. Lee, entitled "A self-restorable architecture for bidirectional wavelength-division-multiplexed passive optical network with colorless ONUs," Optics Express, vol. 15, pp. 4863-4868, 16 Apr. 2007, and proposed by X. Cheng, Y. J. Wen, Z. Xu, Y. Wang, and Y.-K. Yeo, entitled "Survivable WDM-PON with self-protection and in-service fault localization capabilities," Optics Communications, vol. 281, pp. 4606-4611, 2008. However, none of these methods are able to pinpoint the exact fault locations.

In view of the aforementioned drawbacks, the present invention provides an improved fault monitoring system for monitoring nodes and correctly determining a fault location.

SUMMARY OF THE INVENTION

The purpose of the present invention is to provide a bidirectional optical signal traffic-directing and amplification module which may provide highly flexible status monitoring and fault diagnosis of downstream and upstream signals. The system of the present invention can be operated at 10 Gbps, 40 Gbps, or more when the right optical amplifier (for example EDFA) is chosen. Therefore, upgrading the system is very easy, and users can choose the right EDFAs that give different signal gains to meet the system requirement.

Another objective of the present invention is to provide a bidirectional optical signal traffic-directing and amplification module which may monitor nodes and diagnose fault locations. The system may apply to short, intermediate-length, and long-haul optical network monitoring systems.

Yet another objective of the present invention is to provide a traffic and monitoring-signal router module within the wavelength-division-multiplexing passive optical network architecture, wherein the traffic and monitoring-signal router module can expand the system to long-haul (over 50 km) applications.

Still another objective of the present invention is to provide a traffic and monitoring-signal router module, wherein an OTDR path through the traffic and monitoring-signal router module enables the system to cover the traffic signals and OTDR trace together, and it solves the problem that the OTDR signals can not go through the EDFA path.

According to an aspect of the present invention, it provides a bidirectional multiwavelength optical signal routing and amplification module, comprising an optical coupler for passing first data signals, a first monitoring signal and/or a fault locating signal in the downstream direction, and for coupling second upstream traffic and monitoring signals with second upstream fault locating signals; a dichroic dual-band filter coupled to the optical coupler to direct the first data signal and the first monitoring signal to be transmitted passing through one band of the dichroic dual-band filter, the fault locating signal to be passed through the other band of the dichroic dual-band filter; a first optical amplifier coupled to the dichroic dual-band filter for amplifying the first data signal and the first monitoring signal; a three-port optical circulator, the first port coupled to the first optical amplifier, the second port coupled to an arrayed waveguide grating; a first optical isolator coupled to the first optical amplifier and the dichroic dual-band filter; a second optical isolator coupled to the third port of the three-port optical circulator; a second optical amplifier coupled to the second optical isolator for amplifying a second data signal and a second monitoring signal; and a four-port optical circulator, the first port coupled to the second optical amplifier, the second port coupled to the dichroic dual-band filter, the third port coupled to a switching array for routing the fault locating signal, and the fourth port coupled to the optical coupler.

According to another aspect of the present invention, it provides a system of a wavelength-division-multiplexing passive optical network, comprising a first transceiver located in a central office for transmitting and receiving a second data signal, a second transceiver for transmitting and receiving a second monitoring signal and a fault locating apparatus for transmitting and receiving a fault locating signal, and a first arrayed waveguide grating; a traffic and monitoring signal router module coupled to the first arrayed waveguide grating; a second arrayed waveguide grating coupled to the traffic and monitoring-signal router module and a remote unit; a splitter coupled to the second arrayed waveguide grating; and an optical switch array coupled to the splitter and the optical network unit.

The optical network unit includes an optical coupler; a dichroic dual-band filter coupled to the optical coupler; a transmitter coupled to the dichroic dual-band filter; a three-port optical circulator, the first port coupled to the dichroic dual-band filter; a fiber Bragg grating coupled to the second port of the three-port optical circulator; a first receiver coupled to the fiber Bragg grating; and a second receiver coupled to third port of the three-port optical circulator.

BRIEF DESCRIPTION OF THE DRAWINGS

The above objects, and other features and advantages of the present invention will become more apparent after reading the following detailed descriptions when taken in conjunction with the drawings, in which.

DESCRIPTION OF THE PREFERRED EMBODIMENT

Figure 1:
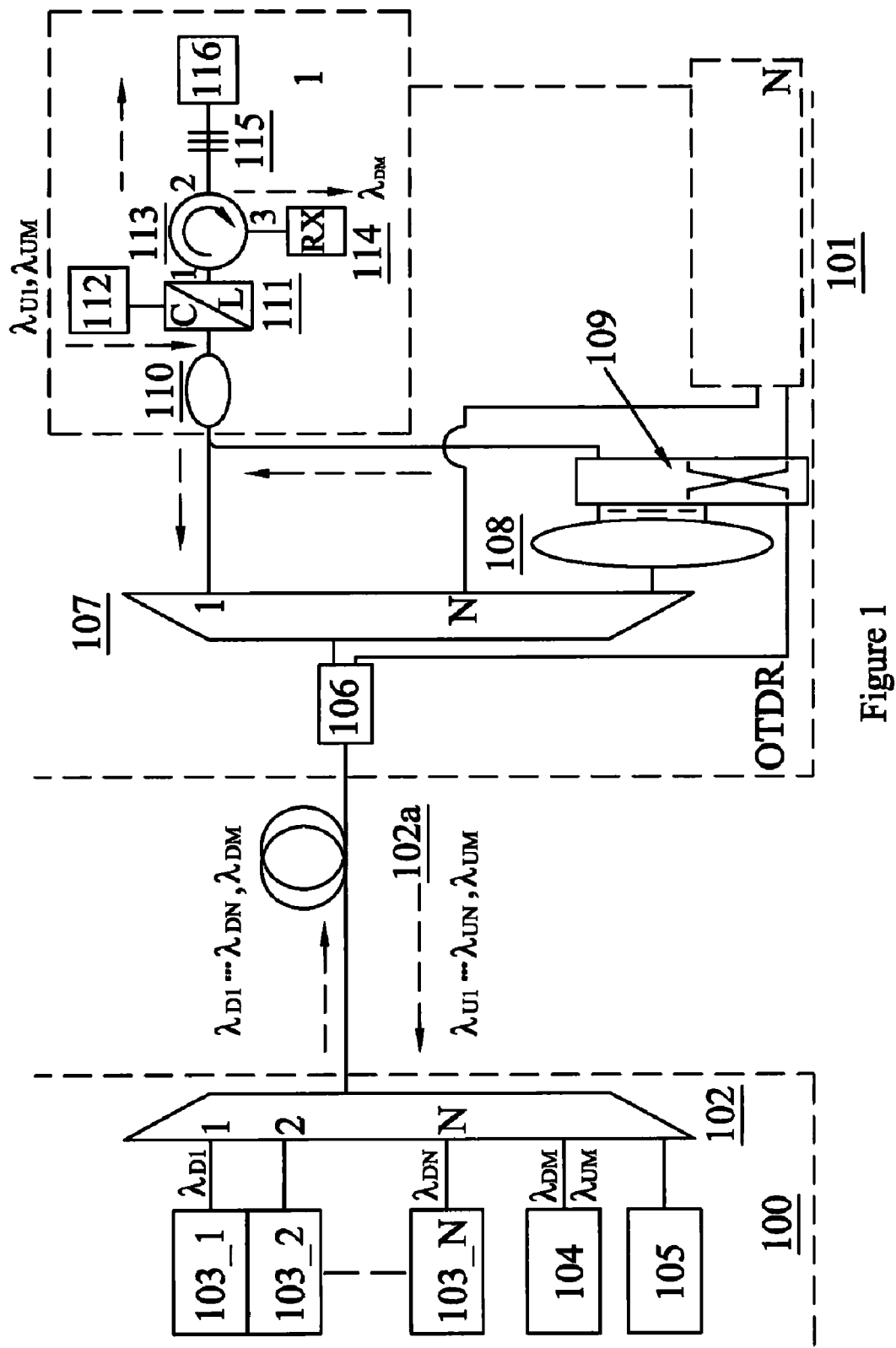
FIG. 1 is a schematic diagram of a wavelength-division-multiplexing passive optical network architecture according to the present invention.

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

A fault-diagnosis system is mainly applied to a passive optical network to detect whether failures occur in the fiber communication network and to determine fault location. The passive optical network has the advantages of concise, low cost, and good reliability, and the architecture of the passive optical network may be chosen as a ring topology, star topology, tree topology or bus topology depending on region, environment or specified requirements.

To overcome the prior art drawbacks, the present invention provides a bidirectional optical signal traffic-directing and amplification module to propose and demonstrate a method for simultaneous real-time status monitoring and troubleshooting of a high-capacity single-fiber hybrid passive optical network (PON) which is based on wavelength-division-multiplexing (WDM) techniques. To avoid interference between the bidirectional traffic, downstream and upstream signals are assigned in different spectral bands. The two main parts of the monitoring and fault-diagnosis functions are a traffic and monitoring-signal router module and a signal-selection switch module. Using an optical time-domain reflectometer, the fault-diagnosis test path can be greater than 50 km. Tests results of this method are presented for 10-Gb/s upstream and downstream links over 35-km distances.

The upstream and downstream traffic signals and monitoring signals can be amplified by an Erbium Doped Fiber Amplifier (EDFA) to get a larger power budget. The EDFA is located in the traffic and monitoring-signal router module. Thus, the present invention concept can be used for networks ranging in size from a small WDM PON to an extended WDM long-haul network. This implementation flexibility is not included in other conventional monitoring and fault-diagnosis methods.

An OTDR function in the present invention can be used simultaneously with both the upstream and downstream traffic signals and the upstream and downstream monitoring signals, even when these signals are enhanced by the EDFA. This is possible since the OTDR trace goes through neither the upstream nor the downstream optical amplifier of the traffic and monitoring-signal router module. This condition is necessary since the OTDR cannot correctly determine a fault location if the reflected signal is amplified. The combined use of an OTDR and amplification of the upstream and downstream traffic signals and monitoring signals cannot be achieved with prior art methods.

The application proposes a high-performance monitoring system for intelligent buildings. In general, intelligent buildings need functions such as a real time monitoring system, faults detecting in the shortest time, and a backup system that can automatically be invoked as a temporary backup solution when the normal upstream and downstream traffic signals are interrupted.

The traffic and monitoring-signal router module can be put into telecom equipment used for metro networks, local area networks, and fiber-to-the-home/fiber-to-the-premises (FTTH/FTTP) networks Referring to FIG. 1, it shows a wavelength-division-multiplexing passive optical network architecture according to the present invention. A single bidirectional optical fiber interconnects optical transceivers (TX/RX) 103_1, 103_2~103_N in a central office (CO) 100 with a set of optical network units (ONUs) 101, which is the equipment at user locations. At the CO, N optically formatted downstream traffic signals (designated by $\lambda_{D1}, \ldots, \lambda_{DN}$) are combined onto a single optical fiber 102a using an arrayed waveguide grating (AWG) 102. The downstream traffic signals $\lambda_{D1}, \ldots, \lambda_{DN}$ are transmitted by the optical transceivers (TX/RX) 103_1, 103_2~103_N, respectively. At the destination, the downstream optical signals are demultiplexed by another AWG 107 and individually routed to the N nodes of optical network units (ONUs) 101. To check the network status, from the central office 100 a downstream monitoring signal, $\lambda_{DM}$, transmitted by the optical transceiver 104 at a wavelength different from the downstream traffic signals, is multiplexed onto the downstream line along with the traffic. Similarly, optically formatted upstream traffic signals (designated by $\lambda_{U1}, \ldots, \lambda_{UN}$) coming from the N nodes of ONUs 101 are multiplexed onto the fiber together with the upstream monitoring signal, $\lambda_{UM}$. All users share the same upstream (return) monitoring wavelength in a time-division-multiplexed (TDM) mode. To avoid interference between the bidirectional traffic, downstream signals are assigned in the L band and upstream signals are in the C band.

The traffic and monitoring-signal routing (TMR) module 106 directs the downstream and upstream traffic signals and monitoring signals along different paths. A splitter 108, for example 1×N splitter, is used to distribute the downstream monitoring signal to all ONUs equally. A switch array (SWA) 109 selects either a standard monitoring signal or a fault-locating optical time domain reflectometer (OTDR) signal. In a normal condition, the SWA 109 sets up each path of all the nodes to receive the downstream monitoring signal. The OTDR signal is substituted for the monitoring signal on faulty lines during troubleshooting events. The demultiplexed downstream traffic signals individually enter ONUs into an optical coupler 110, passing sequentially through a dichroic L-band/C-band filter 111, the first port to second port of a three-port optical circulator 113, and a fiber Bragg grating (FBG) 115, and then are received by a receiver 116. The downstream monitoring signal is reflected by the fiber Bragg grating 115 and then enters into the second port to third port of the three-port optical circulator 113, and then is received by a monitoring receiver 114.

In one preferred embodiment, the remote nodes 101 include an optical coupler 110, a dichroic L-band/C-band filter 111 coupled to the optical coupler 110, a transmitter 112 coupled to the dichroic L-band/C-band filter 111, a three-port optical circulator 113 with first port coupled to the dichroic L-band/C-band filter 111, a fiber Bragg grating 115 coupled to the second port of the three-port optical circulator 113, a first receiver 116 coupled to the fiber Bragg grating 115, and a second receiver 114 coupled to the third port of the three-port optical circulator 113.

Figure 2:
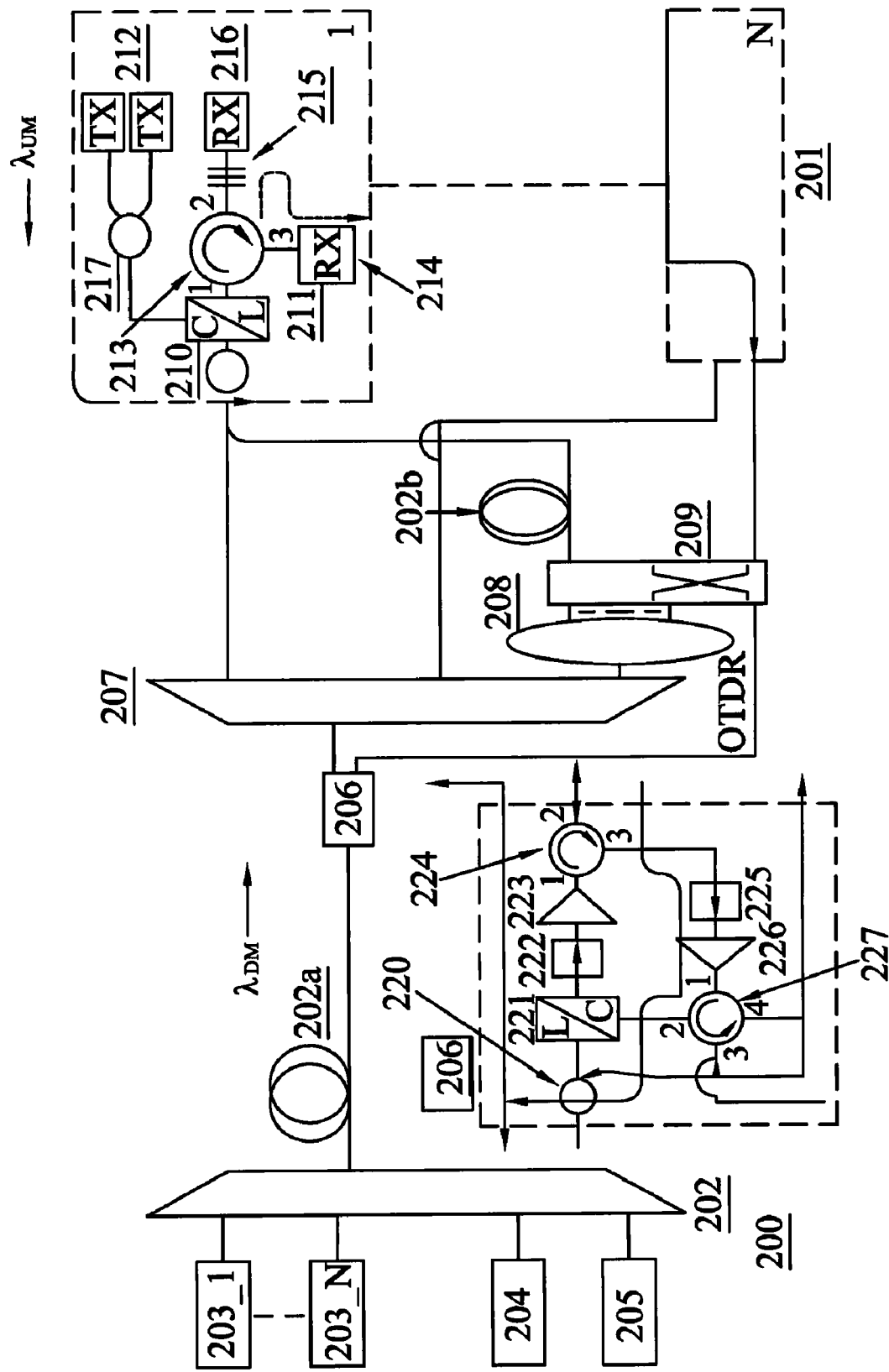
FIG. 2 is a schematic diagram of a wavelength-division-multiplexing passive optical network architecture according to the present invention.

Referring to FIG. 2, it shows a wavelength-division-multiplexing passive optical network architecture according to the present invention. FIG. 2 gives some details of signals transmission flow of the optical network architecture and how the traffic and monitoring-signal router module 206 works. As FIG. 2 illustrates, one of the downstream traffic signals and the split downstream monitoring wavelengths arriving at an ONU pass through the C-band/L-band optical filter and are separated and directed to the ONU data and monitoring receivers, respectively, by means of the optical circulator (OC) and fiber Bragg grating (FBG) combination. Upstream traffic and monitoring signals originating at an ONU are combined with an optical coupler and are inserted onto the optical fiber line by means of the C-band/L-band filter.

In one preferred embodiment, the traffic and monitoring-signal router module 206 includes an optical coupler 220, a dichroic L-band/C-band filter 221, an optical isolator 222, an optical amplifier 223, a three-port optical circulator 224, an optical isolator 225, an optical amplifier 226 and a four-port optical circulator 227. The optical coupler 220 is used for passing first traffic (data) signals, a first monitoring signal and/or a fault locating signal in the downstream direction, and for coupling second upstream traffic and monitoring signals with second upstream fault locating signals. The dichroic L-band/C-band filter 221 is coupled to the optical coupler 220 to direct the first traffic (data) signals and the first monitoring signal through the L-band channel and the fault locating signal through the C-band channel of the dichroic dual-band filter. The optical amplifier 223 is coupled to the dichroic dual-band filter 221 for amplifying the first data signal and the first monitoring signal. The three-port optical circulator 224 has the first port coupled to the optical amplifier 223, and the second port coupled to an arrayed waveguide grating 207. The optical isolator 225 is coupled to the third port of the three-port optical circulator 224, and connected with the optical amplifier 226 for amplifying the second data signal and the second monitoring signal. The four-port optical circulator 227 has the first port coupled to the optical amplifier 226, the second port coupled to the dichroic L-band/C-band filter 221, the third port is coupled to a switching array for routing the fault locating signal, and the fourth port coupled to the optical coupler 220. Moreover, the optical isolator 222 is coupled to the optical amplifier 223 and the dichroic dual-band filter 221.

The downstream traffic signals (designated by $\lambda_{D1}, \ldots, \lambda_{DN}$) coming from the optical transceivers 203_1~203_N of the central office 200 are multiplexed by using an arrayed waveguide grating (AWG) 202, and then enter into the traffic and monitoring-signal router module 206 by an optical fiber 202a, and then pass sequentially through the optical coupler 220, the dichroic L-band/C-band filter 221, and the optical isolator 222, wherein the optical isolator 222 prevents backscattered light from entering the optical amplifier 223, for example an EDFA. The L-band EDFA 223, shown in the top path of the traffic and monitoring-signal router module 206 in FIG. 2, compensates for component signal loss occurring in the downstream path. After amplification by the optical amplifier 223, the downstream signals pass through the first port to the second port of the three-port optical circulator 224 and then enter the arrayed waveguide grating demultiplexer 207 to separate the downstream signals for transmission to individual ONUs. The demultiplexed traffic signals and the split downstream monitoring signals separately arriving at an ONU pass through the optical coupler 210, the C-band/L-band optical filter 211, travel from port 1 to port 2 of the optical circulator 213, and then are directed to the ONU data and monitoring receivers 216.

As the wavelength of the downstream monitoring signal, $\lambda_{DM}$, coming from the optical transceiver 204 of the central office 200 is multiplexed by using an arrayed waveguide grating 202, and then enters into the traffic and monitoring-signal router module 206 by an optical fiber 202a, it passes sequentially through the optical coupler 220, the dichroic L-band/C-band filter 221, and the optical isolator 222. After amplification by the optical amplifier 223, the downstream monitoring signal passes through the first port to second port of the three-port optical circulator 224 and then enters the arrayed waveguide grating 207. Subsequently, the monitoring signal exits from one port of the arrayed waveguide grating 207 and then enters into a splitter 208, for example 1×N splitter, which is used to distribute the monitoring signal to all ONUs equally. A switch array (SWA) 209 selects either the monitoring signals coming from the optical splitter 208 or the OTDR signal coming from the traffic and monitoring-signal router module 206. The outputs from the switch array 209 then go to individual ONUs via an optical fiber 202b, where they pass through the optical coupler 210, the C-band/L-band optical filter 211, and then enter the first port to second port of the three-port optical circulator 213. After being reflected by the fiber Bragg 215 grating 215, they enter the second port to third port of the three-port optical circulator 213, and then are received by a monitoring receiver 214.

Moreover, as the OTDR signal coming from the OTDR equipment 205 is multiplexed by using an arrayed waveguide grating 202, and then enters into the traffic and monitoring-signal router module 206 by the optical fiber 202a, it passes sequentially through the optical coupler 220 and the dichroic L-band/C-band filter 221. The time domain reflectometer signal will come out from the C-band channel of the dichroic L-band/C-band filter 221. Next, the OTDR signal goes into the second port of the four-port optical circulator 227, and then comes out of third port of the four-port optical circulator 227. Subsequently, the OTDR signal arrives at the switch array 209, which decides on whether to select the monitoring signal or the OTDR test signal to check each ONU. While the fault diagnosis conditions are being examined, the system will activate the OTDR signal, which then is substituted for the monitoring signal on faulty lines during troubleshooting events by means of the switch array 209.

The upstream traffic signals and monitoring signal coming from the optical transmitters 212 of the ONUs pass through an optical coupler 217, the C-band/L-band optical filter 211, the optical coupler 210, and are multiplexed by using an arrayed waveguide grating 207, and then enter into the traffic and monitoring-signal router module 206, and pass sequentially through the three-port circulator 224, the optical isolator 225, the optical amplifier 226 and the four-port optical circulator 227. After amplification by the optical amplifier 226, the upstream traffic signals and monitoring signal pass through the first port to second port of the three-port optical circulator 227 and then enter into dichroic L-band/C-band filter 221, and return to the central office 200 via the optical fiber 202a.

In normal operation, the system monitors all ONUs simultaneously by continuously sending status-request messages to all nodes and receiving their acknowledgements. When one of the nodes fails, the system will set up an OTDR trace test to determine fault possibilities of the failed node. Beginning at the transceiver 204 of FIG. 2, the monitoring signal starts sending a message to all ONUs. The wavelength of the downstream monitoring signal, $\lambda_{DM}$, is in the L band. The monitoring signal will follow the same path through the traffic and monitoring-signal router module 206 as the downstream information signal and will be demultiplexed to one port of the arrayed waveguide grating 207. The downstream monitoring signal is used to check all ONUs and operates at a lower speed than the information signal. For example, the information signals operate at 10 GHz and the monitor signal frequency is around 10 MHz to check all nodes in real time. The 1×N splitter 208 is used to distribute the monitoring signal to all ONUs equally. When an ONU receives the downstream monitoring signal, the ONU will send back messages via the upstream monitoring signal. The speed of the upstream TDM-based monitoring signal is low.

When a link fails, the OTDR signal will be reflected from the break point following the same path along which it came. The reflected pulse of the OTDR goes into port 3 of the four-port optical circulator 227 in the traffic and monitoring-signal router module 206 and then comes out of port 4 of the four-port optical circulator 227. Finally, passing through the optical coupler 220, the OTDR pulse goes back to the OTDR equipment 205 by way of the optical fiber 202a to detect the fault location correctly. The whole OTDR trace will go through neither the downstream optical amplifier 223 nor the upstream optical amplifier 226 of the traffic and monitoring-signal router module 206. This condition is necessary since the OTDR cannot correctly determine a fault location if the reflected signal is amplified and it can only calculate the fault distance along one path at a time.

The system of the present invention can send simultaneously the downstream traffic signals (designated by $\lambda_{D1}, \ldots, \lambda_{DN}$), downstream monitoring signal, $\lambda_{DM}$, and the OTDR signal. The downstream traffic signals, monitoring signal and the OTDR test signal work independently, and without interference between the above three-signals. Therefore, the system of the present invention continues to maintain operation of good ONUs whether broken nodes are being diagnosed or not.

The downstream information signals and the downstream monitoring signal will be demultiplexed by the AWG multiplexer located at the ONU end of the network. The downstream traffic signals (designated by $\lambda_{D1}, \ldots, \lambda_{DN}$) and downstream monitoring signal, $\lambda_{DM}$, follow the same path in the traffic and monitoring-signal router module 206 as the downstream information signals. In this architecture, the monitoring signal is equivalent to a traffic data type in either the downstream or upstream direction.

From the above descriptions, the main features and advantages of the wavelength-division-multiplexing passive optical network architecture of the present invention are as follows:

(1) A real-time monitoring and fault diagnosis system which may work in parallel with the user downstream and upstream traffic signals, (2) A monitoring system which may still continue to work on functioning lines while failed lines are being diagnosed, (3) A system in which the monitoring signal and the fault-diagnosing test signal work independently, (4) An expandable monitoring and fault diagnosis system in which more wavelengths can be assigned for additional users, (5) A monitoring and fault diagnosis system in which the monitoring signal can be amplified to get a larger power budget, (6) A monitoring and fault diagnosis system that has multiple redundant paths for network flexibility, (7) A stand-alone subsystem which may convert automatically to be a backup network when failures occur in the main network, (8) A fault diagnosis system in which the OTDR will be used only when a link fault occurs.

Moreover, the traffic and monitoring-signal router module of the present invention within the wavelength-division-multiplexing passive optical network architecture has the following advantages, including (1). It provides a highly flexible syntax structure of downstream and upstream traffic signals, and the system can be operated at 10 Gbps, 40 Gbps, or more when the right optical amplifier (for example EDFA) is chosen, upgrading the system is very easy, and users can choose the right EDFAs that give different signal gains to meet the system requirement; (2). The downstream and upstream traffic and monitoring-signal router module can expand the system to long-haul (over 50 km) applications; (3). An OTDR path through the traffic and monitoring-signal router module has the following features: it enables the system to cover the traffic signal and OTDR trace together, and it solves the problem that the OTDR signals can not go through the EDFA path.

The above descriptions of the invention are illustrative, and are not intended to be limited. It will thus be appreciated that various additions, substitutions and modifications may be made to the above described embodiments without departing from the scope of the present invention. Accordingly, the scope of the present invention should be construed in reference to the appended claims.

What is claimed is:

1. A bidirectional multiwavelength optical signal routing and amplification module, comprising:
    an optical coupler for passing first data signals, a first monitoring signal and/or a fault locating signal in the downstream direction, and for coupling second upstream traffic and monitoring signals with second upstream fault locating signals;
    a dichroic dual-band filter coupled to said optical coupler to direct said first data signals and said first monitoring signal through the L-band channel of said dichroic dual-band filter and said fault locating signal through the C-band channel of said dichroic dual-band filter;
    a first optical amplifier coupled to said dichroic dual-band filter for amplifying said first data signal or said first monitoring signal;
    a three-port optical circulator, the first port coupled to said first optical amplifier, the second port coupled to an arrayed waveguide grating;
    a first optical isolator coupled to said first optical amplifier and said dichroic dual-band filter;
    a second optical isolator coupled to said third port of said three-port optical circulator;
    a second optical amplifier coupled to said second optical isolator for amplifying a second data signal and a second monitoring signal; and a four-port optical
    circulator, the first port coupled to said second optical amplifier, the second port coupled to said dichroic dual-band filter, the third port coupled to said a switching array for routing said fault locating signal, the fourth port coupled to said optical coupler.

2. A module as in claim 1, wherein said dichroic dual-band filter is made by an L-band filter and C-band filter.

3. A module as in claim 2, wherein said first data signal and said first monitoring signal are first downstream signal and second downstream signal respectively, said first downstream signal and said second downstream signal are transmitted by said L-band filter.

4. A module as in claim 2, wherein said fault locating signal is transmitted by said C-band filter, wherein a second data signal and a said second monitoring signal are first upstream signal and second upstream signal respectively, said first upstream signal and said second upstream signal are transmitted by said C-band filter.

5. A module as in claim 1, wherein said first amplifier is an Erbium Doped Fiber Amplifier, wherein said second amplifier is an Erbium Doped Fiber Amplifier.

6. A system of a wavelength-division-multiplexing passive optical network, comprising:
    a first transceiver set located in a central office for transmitting a first data signal and receiving a second data signal a second transceiver for transmitting a first monitoring signal and receiving a second monitoring signal and a fault locating apparatus for transmitting and receiving a fault locating signal, and a first arrayed waveguide grating;
    a traffic and monitoring signal router module coupled to said first arrayed waveguide grating;
    a second arrayed waveguide grating coupled to said traffic and monitoring-signal router module and an optical network unit;
    a splitter coupled to said second arrayed waveguide grating; and
    an optical switch array coupled to said splitter and said optical network unit.

7. A system as in claim 6, wherein said fault locating apparatus is an optical time domain reflectometer.

8. A system as in claim 6, wherein said splitter is used for distributing said at least one monitoring signal to said optical network unit equally.

9. A system as in claim 6, wherein said optical switch array is used to select either said monitoring signal or said fault-locating signal.

10. A system as in claim 6, wherein said traffic and monitoring signal router module includes;
    an optical coupler for passing said first data signals, said first monitoring signal and/or said fault locating signal in the downstream direction, and for coupling said second upstream traffic and said monitoring signals with said second upstream fault locating signals;
    a dichroic dual-band filter coupled to said optical coupler to direct said first data signals and said first monitoring signal through the L-band channel of said dichroic dual-band filter and said fault locating signal through the C-band channel of said dichroic dual-band filter;

a first optical amplifier coupled to said dichroic dual-band filter for amplifying said first data signal and said first monitoring signal;

a three-port optical circulator, the first port coupled to said first optical amplifier, the second port coupled to said arrayed waveguide grating;

a first optical isolator coupled to said first optical amplifier and said dichroic dual-band filter;

a second optical isolator coupled to said third port of said three-port optical circulator;

a second optical amplifier coupled to second optical isolator for amplifying a second data signal and a second monitoring signal; and a four-port optical circulator, the first port coupled to said second optical amplifier, the second port coupled to said dichroic dual-band filter, the third port coupled to said switching array for routing said fault locating signal, the fourth port coupled to said optical coupler.

11. A system as in claim 10, wherein said dichroic dual-band filter is made by L-band filter and C-band filter.

12. A system as in claim 11, wherein said first data signals and said first monitoring signal are first downstream signals and second downstream monitoring signal, respectively, said first downstream signals and said second downstream monitoring signal are transmitted by said L-band filter.

13. A system as in claim 11, wherein said at least one fault locating signal is transmitted passing through said C-band filter, wherein a second data signal and a second monitoring signal are first upstream signals and second upstream monitoring signal respectively, said first upstream signals and said second upstream monitoring signal are transmitted by said C-band filter.

14. A system as in claim 10, wherein said first amplifier is an Erbium Doped Fiber Amplifier, wherein said second amplifier is an Erbium Doped Fiber Amplifier.

15. A system as in claim 10, wherein said optical coupler is coupled to said first arrayed waveguide grating.

16. A system as in claim 6, wherein said optical network unit includes:
    an optical coupler;
    a dichroic dual-band filter coupled to said optical coupler;
    a first data transmitter coupled to said dichroic dual-band filter; and
    a second monitoring-signal transmitter coupled to said dichroic dual-band filter.

17. A system as in claim 16, further comprising a three-port optical circulator, first port coupled to said dichroic dual-band filter.

18. A system as in claim 17, further comprising a fiber Bragg grating coupled to second port of said three-port optical circulator and to a first receiver, wherein the first receiver is a monitoring-signal receiver.

19. A system as in claim 17, further comprising a second receiver coupled to third port of said three-port optical circulator, wherein the second receiver is a data receiver.

20. A system as in claim 16, wherein dichroic dual-band filter is made by L-band filter and C-band filter.

* * * * *